J. B. RUNNER.
VARIABLE SPEED TRANSMISSION DEVICE.
APPLICATION FILED JUNE 13, 1910.
981,797.
Patented Jan. 17, 1911.
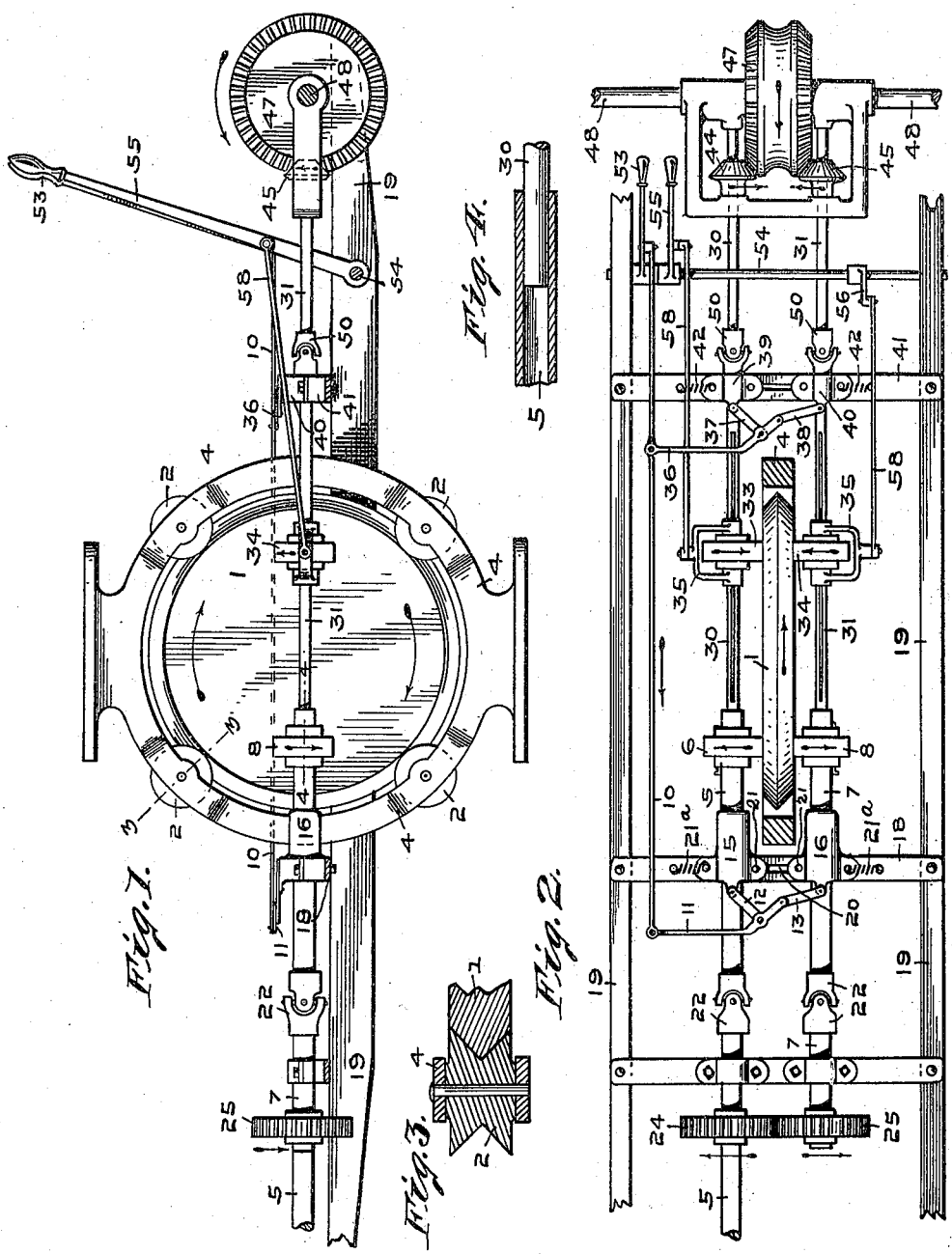
WITNESSES:
W<sup>m</sup> L. Bushong,
L. B. Woerner.
INVENTOR
John B. Runner
By Minturn & Woerner
ATTORNEYS.

UNITED STATES PATENT OFFICE.

JOHN B. RUNNER, OF INDIANAPOLIS, INDIANA.

VARIABLE-SPEED-TRANSMISSION DEVICE.

981,797.  Specification of Letters Patent.  Patented Jan. 17, 1911.

Application filed June 13, 1910. Serial No. 566,659.

*To all whom it may concern:*

Be it known that I, JOHN B. RUNNER, a citizen of the United States, residing at Indianapolis, in the county of Marion and State of Indiana, have invented certain new and useful Improvements in Variable-Speed-Transmission Devices, of which the following is a specification.

This invention relates to a device for transmitting power; and the object of the invention is to provide means whereby the direction of movement of rotation may be changed between the point of production and that of application, and also in the provision of means by which an increase or decrease in the travel of said movement of rotation can be effected.

A further object of the invention is to provide means whereby the speed of the driven parts may be gradually increased or diminished, thereby eliminating the sudden jars that accompany devices of the sliding gear type.

I accomplish the above objects of the invention by means of the mechanism illustrated in the accompanying drawings, forming a part hereof, in which—

Figure 1 is a side elevation of the power transmission device embodying my invention. Fig. 2 is a top or plan view of the construction shown in Fig. 1, except that the housing for the disk wheel is shown in section. Fig. 3 is a fragmentary detail sectional view, on enlarged scale, on the line 3—3 Fig. 1. Fig. 4 is a fragmentary detail sectional view, on enlarged scale, on the line 4—4 Fig. 1.

Referring to the drawings, 1 represents a disk wheel provided with a beveled periphery, said bevel having a like formation from both sides of said disk. The disk 1 is mounted loosely and is supported by means of the friction rollers 2 which are mounted at points at right angles relative to the axis of said disk, and said friction rollers are provided with grooved peripheries corresponding to the peripheral surface of the disk 1 and are adapted to take over the beveled peripheral surface of said disk. The friction rollers 2 are held in their respective positions with one another, and with relation to the disk 1, by means of a housing 4, the latter being suitably anchored to the framework (not shown).

Movement of rotation is imparted to the disk wheel 1 by means of a power shaft 5 having a friction-disk 6 keyed thereto. In order to apply a uniform pressure upon the disk 1, it is desired to mount a second disk in the same horizontal plane as the friction-disk 6 on the opposite side of said disk 1. This is accomplished by providing the power shaft 7 which extends parallel with the shaft 5, and the shaft 7 is provided with a friction disk 8, similar to the disk 6, and is arranged to stand on the opposite side of said disk wheel in the same horizontal plane as that occupied by disk 6. The friction disks 6 and 8 may be simultaneously moved into and out of contact with the disk-wheel 1 by means of an operating rod 10 which pivotally engages the lever 11, and by means of the links 12 and 13 which engage the journal boxes 15 and 16, the latter may be simultaneously moved toward or away from each other and, at the same time, bring the friction disks 6 and 8 into contact or move them out of contact with the disk-wheel 1. By this contact of the friction-disks 6 and 8 against the disk wheel 1 the latter is driven. The shafts 5 and 7 are normally held in their outermost positions by means of the springs 21ª. The journal boxes 15 and 16 are mounted on the cross beam 18 of the frame 19, and the cross beam 18 is provided with a longitudinal slot 20 through which the bolts 21 pass, and by which means the journal boxes are forced to travel in a determined path. In order to permit the friction disks 6 and 8 to be moved into or out of contact with the disk-wheel 1, I provide the universal joints 22 which are interposed in the shafts 5 and 7. Movement of rotation is imparted to the shaft 7 by means of the intermeshing pinions 24 and 25.

Lying within the same longitudinal plane occupied by the secondary shafts 5 and 7 are the shafts 30 and 31. These shafts are of less diameter than either of the shafts 5 and 7 so that the ends of the former may project into the hollow ends of the latter, thereby providing bearings for said shafts 30 and 31. See Fig. 4. The shafts 30 and 31 carry the friction disks 33 and 34, these disks being driven by the disk wheel 1 so that their direction of travel is opposite to the direction of travel of the friction disks 6 and 8. The friction disks 33 and 34 are splined upon the shafts 30 and 31 so that movement of rotation is imparted to said shafts while at the same time said disks 33 and 34 may be moved longitudinally along the shafts 30 and 31, when desired. The object for moving these friction disks will be hereinafter described. The direction of travel of the shafts 30 and 31 is opposite that traveled by the shafts 5 and 7, this being permitted by the telescoped connections between the shafts, as heretofore described. The friction disks 33 and 34, together with the shafts 30 and 31, may be moved toward or away from the disk wheel 1 simultaneously with the movement of the shafts 5 and 7 and the friction disks 6 and 8, by means of the lever 36 which connects with the operating rod 10, similarly to the lever 11. The lever 36 is connected to the links 37 and 38, and the latter pivotally engage the journal boxes 39 and 40, these boxes being movably mounted upon the cross bar 41 and operate similarly to the journal boxes 15 and 16, and the shafts 30 and 31 are normally held in their outermost positions by means of the springs 42. The shafts 30 and 31 are provided with the beveled pinions 44 and 45 which engage a double set of teeth in the gear wheel 47, so that the power is uniformly applied to said gear. The gear wheel 47 is keyed to the shaft 48 and the speed and direction of travel of this shaft is what I desire to regulate and control. The shafts 30 and 31 are also provided with the universal joints 50 which permit the ends of the shafts carrying the friction disks 33 and 34 to be moved toward or away from the disk wheel 1. The operating rod 10 which simultaneously moves the friction disks 6, 8, 33 and 34, connects with a single operating hand lever 53 mounted loosely upon the rock-shaft 54.

As herebefore stated, the disk wheels 33 and 34 are driven by the movement of the disk wheel 1, and that they are splined to the shafts 33 and 34. This connection between the said friction disks and the shafts causes rotary movement to be imparted to the latter, but the said disks may be simultaneously moved longitudinally along said shafts when desired. This simultaneous movement of the friction disks 33 and 34 is accomplished by means of the shippers 35 which are connected to the rock-shaft 54 by means of the hand lever 55, lever 56 and connecting rods 58. This longitudinal movement of the disk wheels 33 and 34 enables the points of contact between said friction disks and the surface of the disk wheel 1 to be changed, so that the direction and speed of rotation may be changed. When the friction disks 33 and 34 are moved across the disk wheel 1 so as to be standing on the same side of the axis as the friction disks 6 and 8, the disk wheels 33 and 34 will be traveling in the same direction as the friction disks 6 and 8. When the friction disks 33 and 34 are standing upon the exact axis of the disk wheel 1 the said friction disks will not rotate at all, this is commonly known as the neutral position. When the friction disks 33 and 34 are moved away from the axis across that portion of the disk wheel 1 and opposite that occupied by the friction disks 6 and 8 their direction of travel will be opposite that traveled by the friction disks 6 and 8, thereby changing the direction of movement of the shafts 31 and 32, the gear wheel 47 and shaft 48. Simultaneously with the movement of the friction disks 33 and 34 from the axis of the disk wheel 1 toward its periphery the movement of rotation of the friction disks 33 and 34 will also be increased, and vice versa. When the friction disks 33 and 34 are moved away from the axis of the disk wheel 1 a distance corresponding to that occupied by the friction disks 6 and 8 the shafts 30 and 31 will be rotated at the same speed as the shafts 5 and 7, although in the opposite direction. When the friction disks 33 and 34 are moved in advance of that point, then the shafts 30 and 31 will be rotating at a higher rate of speed than that traveled by the shafts 5 and 7.

Having thus fully described my said invention, what I desire to secure by Letters Patent, is—

1. A power transmission device including a central power transmission disk wheel, a pair of power shafts arranged on opposite sides of said disk wheel, a friction disk carried by each power shaft and arranged on opposite sides of said disk wheel, a pair of secondary shafts arranged in alinement with the power shafts and making a telescopic fit with said shafts, a friction disk carried by each secondary shaft and arranged on opposite sides of said disk wheel, and a shifting device for moving the power shafts, secondary shafts, and the friction disks carried by all said shafts toward and away from said disk wheel.

2. A power transmission device including a central power transmission disk wheel, a pair of power shafts arranged on opposite sides of said disk wheel, a friction disk carried by each power shaft and arranged on opposite sides of said disk wheel, a pair of secondary shafts arranged in alinement with the power shafts and making a telescopic fit with said shafts, a friction disk carried by each secondary shaft and arranged on opposite sides of said disk wheel, and a shifting device for simultaneously moving the power shafts, secondary shafts, and the friction disks carried by all said shafts toward and away from said disk wheel.

3. A power transmission device including a central power transmission disk-wheel, a pair of power shafts arranged on opposite sides of said disk-wheel, a pair of friction-disks carried by the power shafts and arranged on opposite sides of said central disk-wheel, a pair of secondary shafts arranged in alinement with the power shafts and making a telescopic fit with said shafts, a pair of friction-disks carried by the secondary shafts and arranged on opposite sides of said disk-wheel, said friction-disks having longitudinal movement on said secondary shafts, and means for positively moving said friction-disks along said secondary shafts.

4. A power transmission device including a central power transmission disk-wheel, a pair of power shafts arranged on opposite sides of said disk-wheel, a pair of friction disks carried by the power shafts and arranged on opposite sides of said central disk-wheel, a pair of secondary shafts arranged in alinement with the power shafts and making a telescopic fit with said shafts, a pair of friction-disks carried by the secondary shafts and arranged on opposite sides of said disk-wheel, said friction-disks having longitudinal movement on said secondary shafts, and means for positively moving said friction-disks simultaneously along said secondary shafts.

5. A power transmission device including a central power transmission disk wheel, means for supporting said disk wheel in operative position, a power shaft arranged alongside said disk wheel, a friction wheel fixed to said power shaft, a secondary shaft lying in alinement with and making a telescopic fit with said power shaft, a friction disk mounted upon and susceptible of longitudinal movement along said secondary shaft, means for moving the power shaft and secondary shaft, together with the friction disk carried by each of the said shafts toward and away from said disk wheel, and a tension device for normally holding said power shaft and secondary shaft in their outermost positions away from said disk wheels.

6. A power transmission device including a central power transmission disk wheel, means for supporting said disk wheel in operative position, a power shaft arranged alongside said disk wheel, a friction wheel fixed to said power shaft, a secondary shaft lying in alinement with and making a telescopic fit with said power shaft, a friction disk mounted upon and susceptible of longitudinal movement along said secondary shaft, means for positively moving said friction disk longitudinally of said secondary shaft, means for moving the power shaft and secondary shaft, together with the friction disk carried by each of the said shafts toward and away from said disk wheel, and a tension device for normally holding said power shaft and secondary shaft in their outermost positions away from said disk wheels.

In witness whereof, I have hereunto set my hand and seal at Indianapolis, Indiana, this, 2nd day of June, A. D. one thousand nine hundred and ten.

JOHN B. RUNNER. [L. S.]

Witnesses:
F. W. WOERNER,
F. L. WHITEMAN.